(12) United States Patent
Sippel et al.

(10) Patent No.: US 10,746,054 B2
(45) Date of Patent: *Aug. 18, 2020

(54) TURBINE SHROUD WITH MOVABLE ATTACHMENT FEATURES

(71) Applicants: Rolls-Royce Corporation, Indianapolis, IN (US); Rolls-Royce High Temperature Composites Inc., Cypress, CA (US); Rolls-Royce North American Technologies Inc., Indianapolis, IN (US)

(72) Inventors: Aaron D. Sippel, Zionsville, IN (US); Ted J. Freeman, Danville, IN (US); David J. Thomas, Brownsburg, IN (US); Robert J. Shinavski, Mission Viejo, CA (US); Zacheriah A. Cole, Indianapolis, IN (US)

(73) Assignees: Rolls-Royce Corporation, Indianapolis, IN (US); Rolls-Royce High Temperature High Composites Inc., Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,430

(22) Filed: Jan. 16, 2019

(65) Prior Publication Data

US 2019/0153899 A1    May 23, 2019

Related U.S. Application Data

(63) Continuation of application No. 15/179,295, filed on Jun. 10, 2016, now Pat. No. 10,215,056.

(60) Provisional application No. 62/186,878, filed on Jun. 30, 2015.

(51) Int. Cl.
*F01D 25/24* (2006.01)
*F01D 11/08* (2006.01)

(52) U.S. Cl.
CPC ............ *F01D 25/246* (2013.01); *F01D 11/08* (2013.01); *F05D 2230/644* (2013.01); *F05D 2240/11* (2013.01); *F05D 2240/55* (2013.01); *F05D 2300/6033* (2013.01); *Y02T 50/672* (2013.01)

(58) Field of Classification Search
CPC .................. F01D 11/08; F01D 25/246; F05D 2300/6033; F05D 2240/11; F05D 2240/55; F05D 2230/644
USPC ...................................... 415/173.1
See application file for complete search history.

(56) References Cited

U.S. PATENT DOCUMENTS

| | | |
|---|---|---|
| 6,702,550 B2 | 3/2004 | Darkins, Jr. et al. |
| 6,733,235 B2 | 5/2004 | Alford et al. |
| 6,896,483 B2 | 5/2005 | Dierksmeier et al. |
| 7,052,235 B2 | 5/2006 | Alford et al. |
| 7,278,820 B2 | 10/2007 | Keller |

(Continued)

FOREIGN PATENT DOCUMENTS

WO        9744570        11/1997

*Primary Examiner* — Timothy L Maust
(74) *Attorney, Agent, or Firm* — Barnes & Thornburg LLP (57) ABSTRACT

A turbine shroud for positioning radially outside of blades of a turbine rotor includes a carrier, a blade track, and a track attachment system. The blade track is moved radially outwardly into a cavity of the carrier, and the track attachment system is adjusted to block radially inward movement of the blade track out of the cavity.

20 Claims, 5 Drawing Sheets

(56) References Cited

U.S. PATENT DOCUMENTS

| | | |
|---|---|---|
| 7,556,475 B2 | 7/2009 | Roberts, III et al. |
| 7,575,409 B2 | 8/2009 | Dierksmeier et al. |
| 9,920,656 B2 | 3/2018 | Landwehr et al. |
| 9,945,256 B2 | 4/2018 | Freeman et al. |
| 10,215,056 B2 * | 2/2019 | Sippel ............... F01D 25/246 |
| 2007/0020095 A1 | 1/2007 | Dierksmeier et al. |
| 2008/0178465 A1 | 7/2008 | Schiavo et al. |
| 2009/0010755 A1 | 1/2009 | Keller et al. |
| 2009/0053050 A1 | 2/2009 | Bruce et al. |
| 2009/0060747 A1 | 3/2009 | Strock et al. |
| 2009/0079139 A1 | 3/2009 | Schiavo et al. |
| 2009/0266082 A1 | 10/2009 | O'Leary |
| 2010/0028129 A1 | 2/2010 | Reed |
| 2010/0092281 A1 | 4/2010 | Habarou et al. |
| 2016/0169038 A1 | 6/2016 | Weaver et al. |
| 2017/0101882 A1 | 4/2017 | Sippel et al. |

* cited by examiner

TURBINE SHROUD WITH MOVABLE ATTACHMENT FEATURES

CROSS REFERENCE TO RELATED APPLICATIONS

This application is a continuation of U.S. patent application Ser. No. 15/179,295, filed 28 Jun. 2016, which claims priority to and the benefit of U.S. Provisional Patent Application No. 62/186,878, filed 30 Jun. 2015, the disclosures of which are now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Blade tracks of such shrouds block gas from leaking through the shroud during operation of the gas turbine engine. Thus, more gas is forced to pass over the blades included in the rotating wheel assemblies which extract work from the gas.

SUMMARY

The present disclosure may comprise one or more of the following features and combinations thereof.

According to an aspect of the disclosure, a segmented turbine shroud extends around a central axis and includes a carrier segment that extends partway around the central axis and that forms a radially inwardly-opening cavity surrounded on four sides, a blade track segment including ceramic-containing materials and being formed to include a runner that extends partway around the central axis and a positioner attachment post that extends radially outward from the runner into the radially inwardly-opening cavity of the carrier segment, the positioner attachment post formed to include a track-positioning surface that extends both radially and axially, and a track attachment system adapted to couple the blade track segment to the carrier segment. The track attachment system includes a positioner coupled to the carrier segment to move axially from a disengaged position out of contact with the positioner attachment post to an engaged position contacting the positioner attachment post to engage the track-positioning surface of the positioner attachment post with a position-setting surface that extends both radially and axially at an angle corresponding to that of the track-positioning surface.

In some embodiments, the position-setting surface is formed by the positioner.

In some embodiments, the positioner is formed to include positioner threads that engage corresponding threads formed in the carrier segment.

In some embodiments, the position-setting surface is formed by the carrier segment.

In some embodiments, the blade track segment includes a retainer attachment post that extends radially outward into the radially inwardly-opening cavity of the carrier segment for arrangement within the inwardly-opening cavity of the carrier segment.

In some embodiments, the track attachment system includes a retainer coupled to the carrier segment to move axially from a disengaged position arranged to allow radially outward movement of the retainer attachment post into the radially inwardly-opening cavity of the carrier segment to an engaged position arranged to block radially inward movement of the retainer attachment post out of the radially inwardly-opening cavity of the carrier segment.

In some embodiments, the retainer attachment post has an L-shaped cross sectional profile, the L-shaped cross sectional profile includes a generally radially extending portion and a generally axially extending portion, and the retainer of the track attachment system is arranged radially inward of the axially extending portion when the retainer is in the engaged position.

In some embodiments, the track attachment system includes a step formed integrally with the carrier segment and arranged to contact a radially inner surface of the retainer attachment post to block radially inward movement of the retainer attachment post out of the radially inwardly-opening cavity of the carrier segment when the positioner is in the engaged position.

In some embodiments, the retainer attachment post has an L-shaped cross sectional profile, the L-shaped cross sectional profile includes a generally radially extending portion and a generally axially extending portion, and the step of the track attachment system is arranged radially inward of the axially extending portion when the retainer attachment post is within the inwardly-opening cavity of the carrier segment.

In some embodiments, the carrier comprises a forward side wall, an aft side wall, a first circumferential end cap, and a second circumferential end cap that cooperate to define the radially inwardly-opening cavity of the carrier segment, the first circumferential end cap is formed to include a circumferentially-opening strip-seal slot sized to receive a strip seal, and the second circumferential end cap is formed to include a circumferentially-opening strip-seal slot sized to receive a strip seal.

According to another aspect of the disclosure, a segmented turbine shroud extends around a central axis and includes a carrier segment that extends partway around the central axis and that forms a radially inwardly-opening cavity surrounded on four sides, a blade track segment including ceramic-containing materials and being formed to include a runner that extends partway around the central axis and a retainer attachment post that extends radially outwardly into the radially inwardly-opening cavity of the carrier segment, and a track attachment system adapted to couple the blade track segment to the carrier segment. The track retainer system including a retainer coupled to the carrier segment to move axially from a disengaged position arranged to allow radially outward movement of the retainer attachment post into the radially inwardly-opening cavity of the carrier segment to an engaged position arranged to block radially inward movement of the retainer attachment post out of the radially inwardly-opening cavity of the carrier segment.

In some embodiments, the retainer attachment post has an L-shaped cross sectional profile, the L-shaped cross sectional profile includes a generally radially extending portion and a generally axially extending portion, and the retainer of the track attachment system is arranged radially inward of the axially extending portion when the retainer is in the engaged position.

In some embodiments, the blade track segment includes a metallic insert that extends radially inward from the axially extending portion of the L-shaped cross sectional profile of the retainer attachment post and that is directly engaged by the retainer of the track attachment system when the retainer is in the engaged position.

In some embodiments, the blade track segment includes a positioner attachment post that extends radially outward into the radially inwardly-opening cavity of the carrier segment, the positioner attachment post formed to include a track-positioning surface that extends both radially and axially, and the track attachment system including a positioner coupled to the carrier segment to move axially from a disengaged position out of contact with the positioner attachment post to an engaged position contacting the positioner attachment post to engage the track-positioning surface of the positioner attachment post with a position-setting surface that extends both radially and axially.

In some embodiments, the position-setting surface is formed by the positioner.

In some embodiments, the position-setting surface is formed by the carrier segment.

In some embodiments, the retainer attachment post has an L-shaped cross sectional profile, the L-shaped cross sectional profile includes a generally radially extending portion and a generally axially extending portion, the axially extending portion of the L-shaped cross sectional profile has an end face surface that extends both radially and axially, and the end face surface engages an face engagement surface formed by the carrier segment that extends both axially and radially along an angle corresponding to that of the end face surface when the position is in the engaged position.

In some embodiments, the carrier comprises a forward side wall, an aft side wall, a first circumferential end cap, and a second circumferential end cap that cooperate to define the radially inwardly-opening cavity of the carrier segment, the first circumferential end cap is formed to include a circumferentially-opening strip-seal slot sized to receive a strip seal, and the second circumferential end cap is formed to include a circumferentially-opening strip-seal slot sized to receive a strip seal.

According to another aspect of the disclosure, a method of assembling a segmented turbine shroud that extends around a central axis includes moving a blade track segment formed to include a runner, a retainer post, and a positioner post radially outward so that the retainer post and the positioner post are received in a radially inwardly opening cavity formed by a carrier segment, and attaching the blade track segment to the carrier segment with a track attachment system by (i) contacting the retainer post with the carrier, and (ii) moving a positioner coupled to the carrier axially from a disengaged position out of contact with the positioner post to an engaged position contacting the positioner post to engage a track-positioning surface of the positioner post with a position-setting surface that extends both radially and axially at an angle corresponding to an angle of the track-positioning surface, by rotating the positioner relative to the carrier segment so that positioner threads included in the positioner engage corresponding threads formed in the carrier segment to cause axial movement of the positioner.

In some embodiments, contacting the retainer post includes rotating a retainer of the carrier segment relative to the carrier segment so that retainer threads included in the retainer engage corresponding threads formed in the carrier segment to cause axial movement of the retainer.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
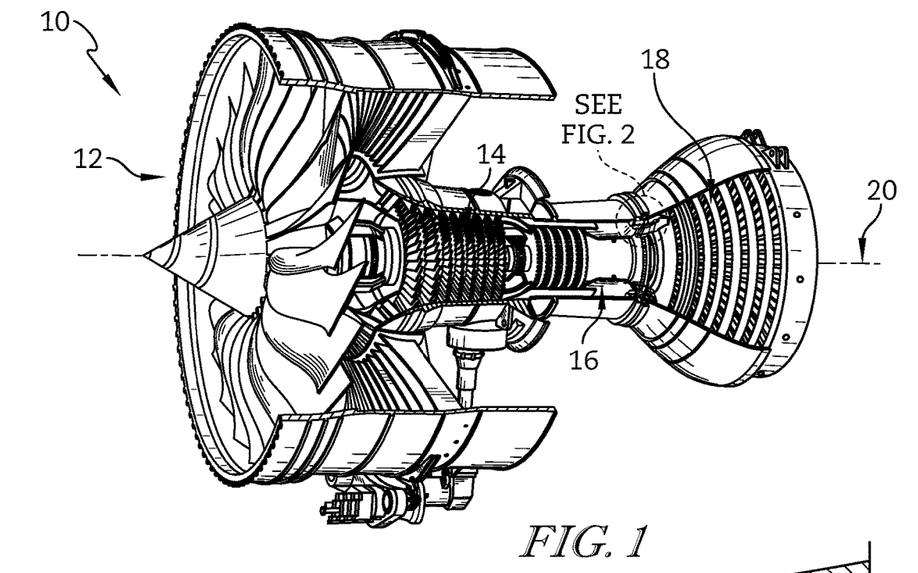
FIG. 1 is a partial perspective view of gas turbine assembly according to the present disclosure with a portion cut away showing that the assembly includes a fan, a compressor, and a turbine including a segmented turbine shroud.

An illustrative gas turbine engine 10 with a portion cut away is shown in FIG. 1 to illustrate that the engine 10 includes a fan 12, a compressor 14, a combustor 16, and a turbine 18. The fan 12 is driven by the turbine 18 and provides thrust for driving a load (not shown), for example propulsion of an air vehicle. The compressor 14 compresses and delivers air to the combustor 16. The combustor 16 mixes fuel with the compressed air from the compressor 14 and combusts the mixture. The hot, high-pressure exhaust products of the combustion reaction in the combustor 16 are directed into the turbine 18 to cause the turbine 18 to rotate about an axis 20 and drive the compressor 14 and the fan 12.

Figure 2:
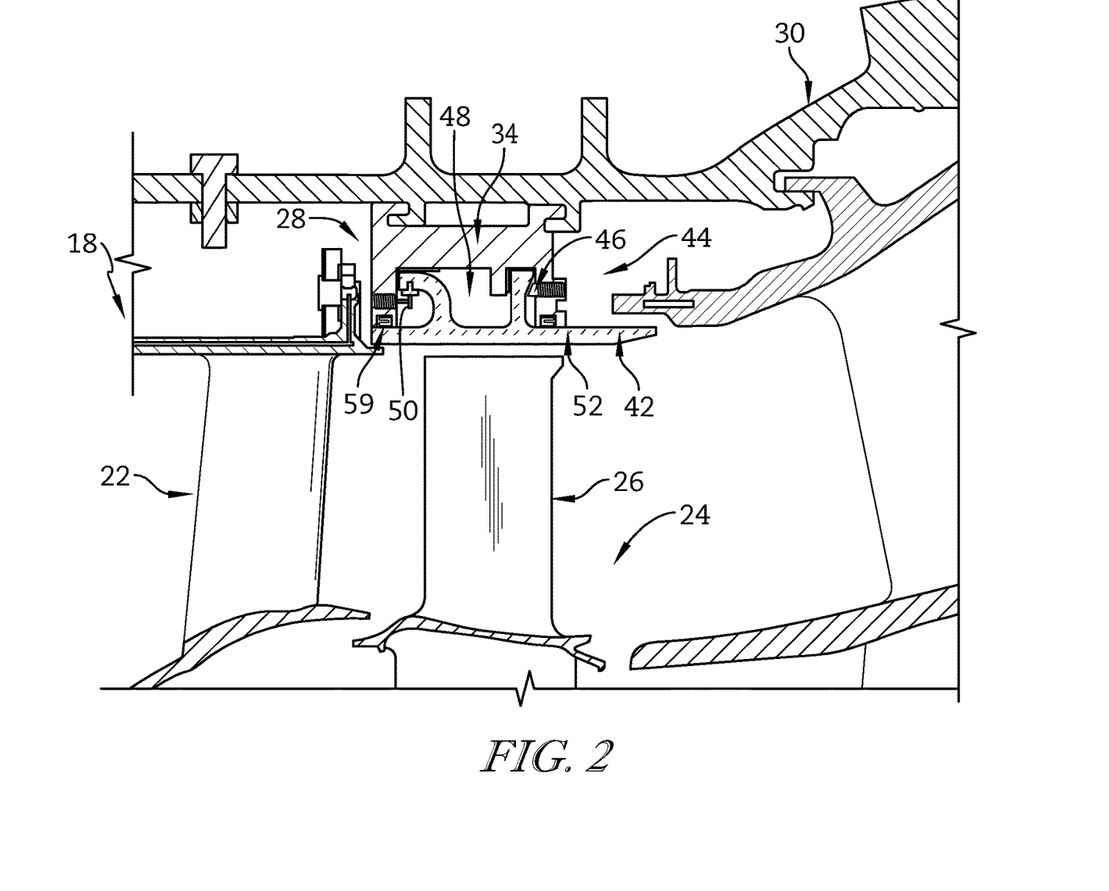
FIG. 2 is a cross-sectional view of a portion of the turbine shown in FIG. 1 showing that the turbine shroud includes a carrier, a blade track, and a track attachment system for attaching the blade track to the carrier.

Referring now to FIG. 2, a portion of the turbine 18 is shown to include static turbine vane assembly 22 and a turbine wheel assembly 24. The vane assembly 22 extends across the flow path of the hot, high-pressure exhaust products from the combustor 16 to direct the exhaust toward blades 26 of the turbine wheel assembly 24. The flow of combustion exhaust applies force to the blades 26 to cause the turbine wheel assembly 24 to rotate, thereby driving the rotating components of the compressor 14 and the fan 12.

Figure 3:
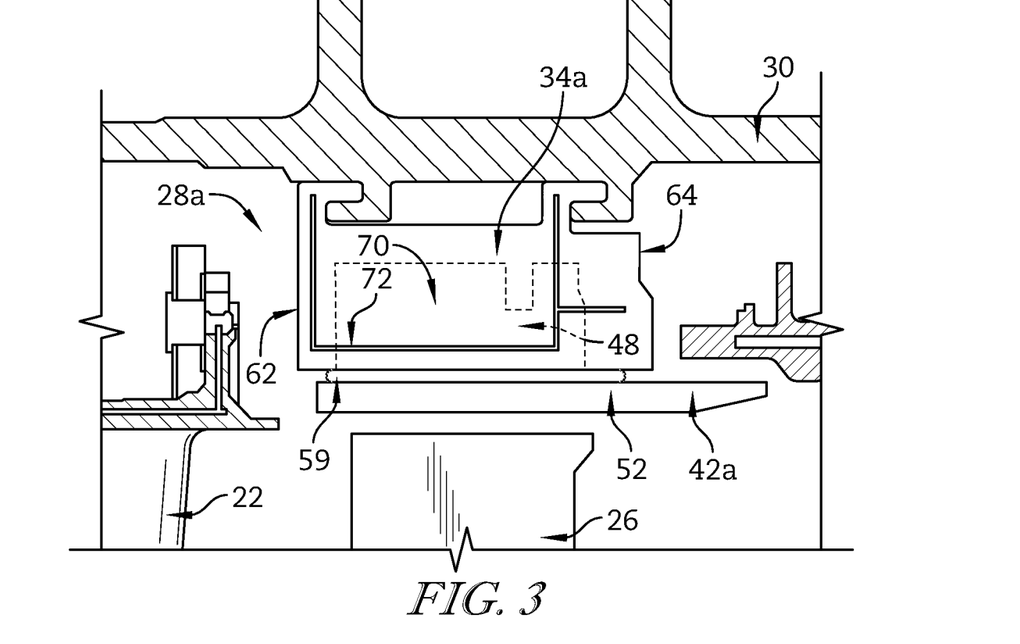
FIG. 3 is a cross-sectional view of a portion of the turbine shown in FIGS. 1 and 2 showing that the carrier of the turbine shroud includes a carrier segment having a segment end that has a strip-seal slot sized to receive a strip-seal.

The turbine 18 also includes a turbine shroud 28 that extends around turbine wheel assembly 24 to encourage combustion exhaust to flow in a manner that applies force to the blades 26 as shown in FIGS. 2 and 3. Combustion exhaust that passes over the blades 26 does not apply force to the blades 26 and such pass-over exhaust creates operational performance loss. Turbine shroud 28 is illustratively comprised of a plurality of turbine shroud segments 28a arranged within a casing 30 to form an annular ring as suggested in FIGS. 1 and 2.

The turbine shroud 28 includes a carrier 34, a blade track 42, and a track attachment system 44, as shown in FIG. 2. The carrier 34 is illustratively attached to the casing 30 and is configured to engage the blade track 42 through the track attachment system 44 suggested in FIG. 2. The track attachment system 44 couples the blade track 42 to the carrier 34 by engagement of ramped surfaces as suggested in FIG. 2.

Figure 4:
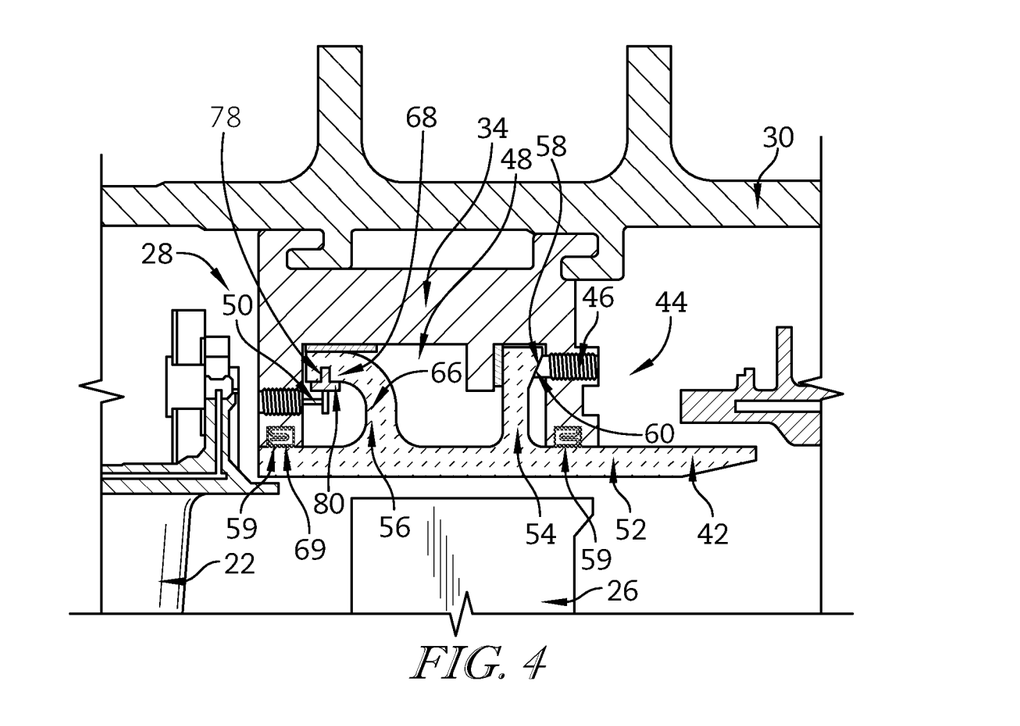
FIG. 4 is a detailed cross-sectional view of illustrative embodiments of the turbine shroud of FIGS. 1 and 2 taken at a different cross-sectional location showing that the track attachment system includes a positioner threadedly engaged with the carrier to move axially from a disengaged position to an engaged position contacting a positioner post included in the blade track urging a track-positioning surface of the positioner post into engagement with a position-setting surface of the positioner and a retainer threadedly engaged with the carrier to move axially into an engaged position contacting an L-shaped retainer post included in the blade track.

The track attachment system 44 includes a positioner 46, illustrated as a custom set screw, as shown in FIG. 4. The positioner 46 is illustratively coupled to the carrier 34 for axial movement between a disengaged position (suggested in FIG. 8) and an engaged position (suggested in FIG. 4). In the disengaged position, the positioner 46 is illustratively arranged out of contact with the blade track 42 of the carrier 34 to permit radial movement of the blade track 42 into a radially inwardly-opening cavity 48 of the carrier as suggested in FIG. 8. In the engaged position, the positioner 46 is illustratively arranged in contact with the blade track to block radial movement of the blade track 42 out of the cavity 48 of the carrier 43 and to set the position of the blade track 42 relative to the carrier 34 as suggested in FIG. 4.

The track attachment system 44 also includes a retainer 50, illustrated as a custom set screw, illustratively shown in FIG. 4. The retainer 50 is illustratively coupled to the carrier for axial movement between a disengaged position (suggested in FIG. 8) and an engaged position (suggested in FIG. 4). In the disengaged position, the retainer 50 is illustratively arranged out of contact with the blade track 42 of the carrier 34 to permit radial movement of the blade track 42 into the radially inwardly-opening cavity 48 of the carrier 34 as suggested in FIG. 8. In the engaged position, the retainer 50 is illustratively arranged in contact with the blade track to block radial movement of the blade track 42 out of the radially inwardly-opening cavity 48 of the carrier 43 as suggested in FIG. 4.

The blade track 42 includes a runner 52, a positioner attachment post 54, and a retainer attachment post 56 as shown in FIG. 4. The attachment posts 54, 56 each extend radially outward from the runner 52 as suggested in FIG. 4. The attachment posts 54, 56 are illustratively arranged within the cavity 48 of the carrier 34 to couple the blade track 42 to the carrier 34. The positioner attachment post 54 illustratively includes a track-positioning surface 58 that extends both axially and radially at an angle. The track-positioning surface 58 is configured for contact with a position-setting surface 60 of the positioner 46 to block movement of the blade track 42 out of the cavity 48 of the carrier 34 and to orient the blade track 42 relative to the carrier 34. When the blade track 42 is arranged within the cavity 48 and the positioner 46 is in the engaged position contacting the positioner attachment post 54, the track-positioning surface 58 is urged into engagement with the position-setting surface 60 as suggested in FIG. 4.

The position-setting surface 60 of the positioner 46 extends radially and axially at an angle corresponding to that of the track-positioning surface 58 and is configured for engagement with the track-positioning surface 58 as suggested in FIG. 4. In illustrative embodiments as suggested in FIG. 4, the position-setting surface 60 is illustratively formed on an end of the positioner 46 and moves with the positioner 46 between the disengaged and the engaged positions. The track-positioning surface 58 is illustratively formed on an aft side of the positioner attachment post 54 and is configured for contact with the position-setting surface 60 to engage the position-setting surface 60 of the positioner 46 and establish a ramped attachment while in the engaged position. Upon full engagement of the positioner 46, a radially outer surface of the positioner attachment post 54 contacts the carrier to locate the blade track 42. Accordingly, in some embodiments, the radially outer surface of the positioner attachment post 54 is machined to a tight tolerance generally perpendicular to CMC fibers included in the blade track 42.

In illustrative embodiments, the retainer attachment post 56 has an L-shaped cross-sectional profile as suggested in FIG. 4. The L-shaped cross-sectional profile includes a generally radially extending portion 66 and a generally axially extending portion 68 as suggested in FIG. 4. The generally radially extending portion 66 is illustratively connected on one end to a radially outer surface of the runner 52 and on the other end to an end of the generally axially extending portion 68.

In illustrative embodiments, the blade track 42 includes an end face 74 as suggested in FIG. 4. The end face 74 is illustratively formed on a side of the retainer attachment post 56. The end face 74 is illustratively configured for engagement with a face engagement surface 76 formed by the carrier complimentarily to the end face 74. The face engagement surface 76 of the carrier 34 is illustratively formed by a compliant high temperature gasket that is more compliant than the carrier 34 and the blade track 42. In some embodiments, the end face 74 and the face engagement surface 76 are configured for contact with each other but are positioned in spaced apart relation to permit limited axial translation of the blade track 42.

In illustrative embodiments, the retainer attachment post 56 includes an insert member 80 as suggested in FIG. 4. The insert member 80 illustratively includes an end formed on a radially outward side thereof and configured for insertion into a depression 78 formed on a radially inward side of the generally axially extending portion 68 of the retainer attachment post 56 as suggested in FIG. 4. The insert member 80 is illustratively formed of a least one sacrificial layer to ease contact between the blade track 42 and carrier 34. The insert member 80 is illustratively configured to extend radially inwardly from the depression 78 to contact an upper surface of the retainer 50 to block radially inward movement of the retainer attachment post 56 out of the radially inwardly-opening cavity 48. The insert member 80 allows for machining into a metal instead of CMC fibers when setting specific engagement points of the assembly.

In illustrative embodiments, the turbine shroud 28 is a segmented turbine shroud comprised of a plurality of turbine shroud segments 28a as suggested in FIG. 3. The carrier 34 is illustratively comprised of a plurality of segmented carrier segments 34a having a forward side wall 62 and an aft side wall 64 and having first and second circumferential end caps 70 as suggested in FIG. 3. The forward and aft side walls 62, 64 and the first and second circumferential end caps 70 are configured to define the radially inwardly-opening cavity 48 inside the carrier 34 as suggested in FIG. 3. The radially inwardly-opening cavity 48 of the carrier 34 is configured to receive the attachment posts 54, 56 of the blade track 42. The circumferential end caps 70 illustratively include a circumferentially—opening strip-seal slot 72 configured to receive a seal strip to provide sealing between the carrier segments 34a.

In illustrative embodiments, the positioner 46 of the track attachment system 44 includes external threads 90 disposed on an outer surface thereof as suggested in FIG. 4. The external threads 90 are configured to engage corresponding internal threads 91 of carrier 34. Illustratively, engagement of the external 90 and internal 91 threads permits adjustment of the positioner 46 between the disengaged and the engaged positions.

In illustrative embodiments, the retainer 50 of the track attachment system 44 illustratively includes external threads 92 disposed on an outer surface thereof as suggested in FIG. 4. The external threads are configured to engage with corresponding internal threads 93 of carrier 34. Illustratively, engagement of the external 92 and internal threads 93 permits adjustment of the retainer 50 between the disengaged and the engaged positions. In some embodiments, the retainer 50 may comprise a cam pin configured to permit adjustment of a radial height of a point of contact with the insert member 80 of the blade track 42.

In illustrative embodiments, the track attachment system 44 includes multiple positioners 46. Positioners 46 are illustratively positioned circumferentially at evenly spaced positions around the carrier 34 to permit attachment of the blade track 42. In illustrative embodiments, each carrier segment 34a includes three positioners 46.

In illustrative embodiments, the track attachment system 44 includes multiple retainers 50. Retainers 50 are illustratively positioned circumferentially at evenly spaced positions around the carrier 34 to permit attachment of the blade track 42. In illustrative embodiments, each carrier segment 34a includes three retainers 50. In some embodiments, the retainers 50 are formed of a single step that is integral with the carrier segment 34a and extends along the length of the carrier segment 34a.

Figure 8:
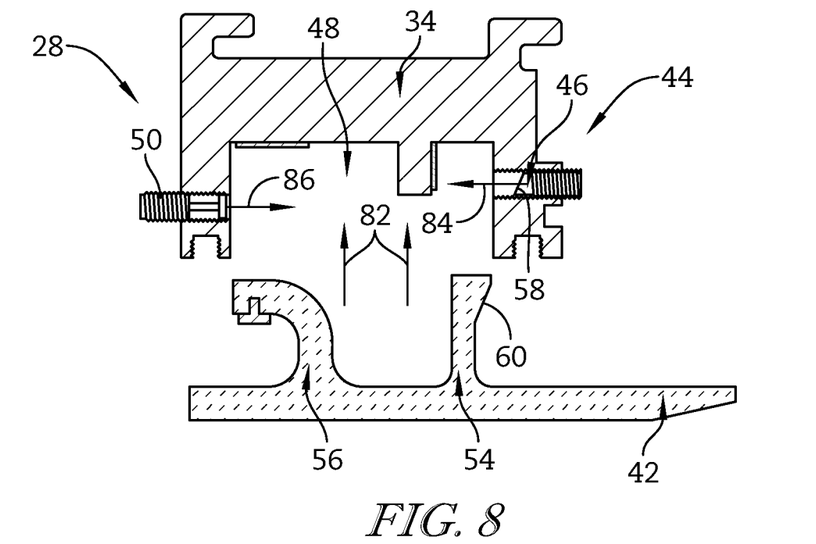
FIG. 8 is a cross-sectional view of an illustrative assembly process of the turbine shroud of FIGS. 1-4 that is also generally applicable to the turbine shroud of FIG. 5 showing radial movement of the blade track segment and axial movement of the positioner and the retainer.

According to one illustrative method of assembling the turbine shroud 28, while the positioner 46 and the retainer 50 are in their disengaged positions, the blade track 42 is moved radially outward such that the first and retainer attachment posts 54, 56 are received within the inwardly-opening cavity 48 of the carrier 34 as suggested in FIG. 8. The arrows 82 indicate the radially outward movement of the blade track 42. Once the first and retainer attachment posts 54, 56 are received, the retainer 50 is illustratively moved to its engaged position as indicated by arrow 86 as suggested in FIG. 8. The positioner 46 is illustratively moved to its engaged position as indicated by arrow 84 such that the position-setting surface 60 engages the track-positioning surface 58 to couple the blade track 42 to the carrier 34.

The illustrative positioner 46 is moved by rotating the positioner 46 such that positioner threads engage corresponding carrier threads to cause axial movement of the positioner 46. In some embodiments, the retainer 50 is moved by rotating the retainer 50 such that retainer threads engage corresponding carrier threads to cause axial movement of the retainer 50.

In the illustrative embodiment, a bent-sheet seal 59 extends around the attachment posts 54, 56 and is arranged between the carrier 34 and the runner 52 of the blade track 42 as shown in FIGS. 3 and 4. The seal 59 seals the cavity 48 from hot gasses passing over the runner 52 of the blade track 42. The seal 59 is received in a radially-inwardly opening channel 69 formed in the carrier 34 and is itself formed to include lobes opening toward the cavity 48 so that pressure in the cavity 48 pushes the seal into contact with the carrier 34 and the runner 52 of the blade track 42. Seal 59 may be full annular or may be made up of a number of seal segments.

In the illustrative embodiment, the blade track 42 is formed of one or more ceramic matrix composite (CMC) materials. In some embodiments, the CMC materials may include one or more of silicon carbide and oxides of aluminum.

Figure 5:
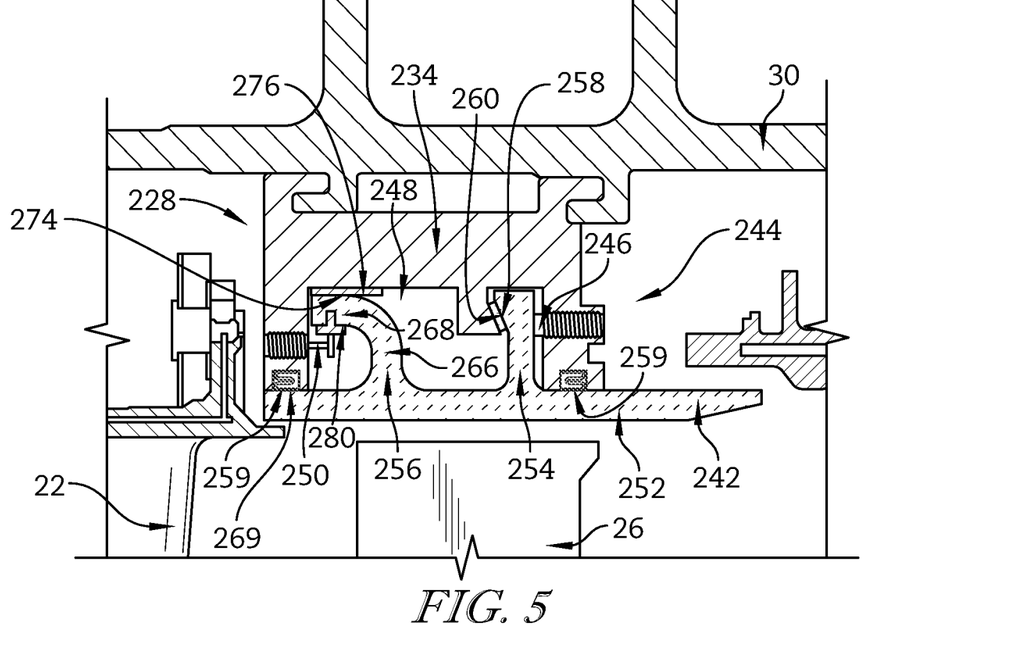
FIG. 5 is a detailed cross-sectional view of a second track attachment system adapted for use in the turbine shroud of FIGS. 1-3 showing that the track attachment system includes a positioner threadedly engaged with the carrier to move axially from a disengaged position to an engaged position contacting a positioner post included in the blade track urging a track-positioning surface of the positioner post into engagement with a position-setting surface of the carrier and a retainer threadedly engaged with the carrier to move axially into an engaged position contacting a retainer post included in the blade track.

Referring now to FIG. 5, a second illustrative turbine shroud 228 is shown. The turbine shroud 228 is configured for use in engine 10 and is substantially similar to the turbine shroud 28 shown in FIGS. 1-4 and described herein. Accordingly, similar reference numbers in the 200 series indicate features that are common between the turbine shroud 28 and the turbine shroud 228. Further, the method of assembling the turbine shroud 228 is similar to the method of assembling the turbine shroud 28 described herein. The description of the turbine shroud 28 and its method of assembly are hereby incorporated by reference to apply to the turbine shroud 228, except in instances when it conflicts with the specific description and drawings of the turbine shroud 228.

Unlike the turbine shroud 28, a track attachment system 244 adapted for use in a turbine shroud 228 of the engine 10 includes a track-positioning surface 258 illustratively formed on a forward side of the positioner attachment post 254. The position-setting surface 260 is illustratively arranged on an opposite side of the positioner attachment post 254 from the positioner 246. In illustrative embodiments, when the positioner 246 is in the engaged position contacting an aft side of the positioner attachment post 254, the positioner attachment post 254 is urged in a direction away from the positioner 246 such that the track-positioning surface 258 engages the position-setting surface 260 to couple the blade track 242 to the carrier 234 with ramped attachment as suggested in FIG. 5.

Figure 6:
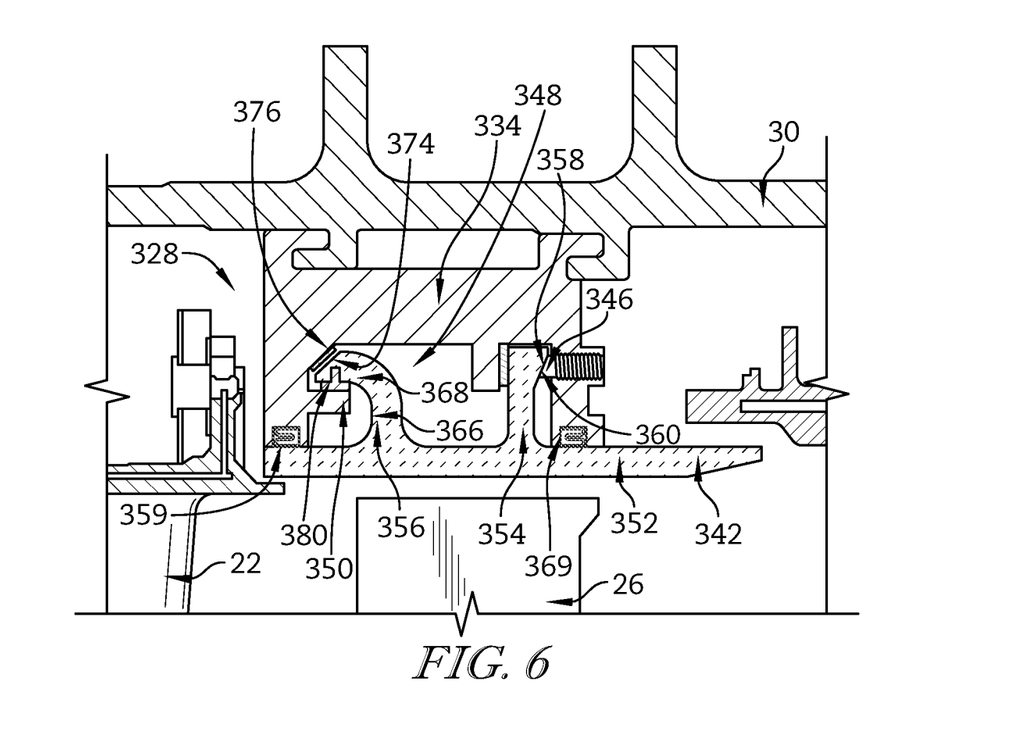
FIG. 6 is a detailed cross-sectional view of a third track attachment system adapted for use in the turbine shroud of FIGS. 1-3 showing that the retainer of the track attachment system is a step formed integrally with the carrier and arranged to contact the retainer post of the blade track segment to block radially inward movement of a retainer post out of the inwardly-opening cavity of the carrier segment when the positioner is in the engaged position.

Referring now to FIG. 6, a third illustrative turbine shroud 328 is shown. The turbine shroud 328 is configured for use in engine 10 and is substantially similar to the turbine shroud 28 shown in FIGS. 1-4 and described herein. Accordingly, similar reference numbers in the 300 series indicate features that are common between the turbine shroud 28 and the turbine shroud 328. The description of the turbine shroud 28 and its method of assembly are hereby incorporated by reference to apply to the turbine shroud 228, except in instances when it conflicts with the specific description and drawings of the turbine shroud 328.

Unlike the turbine shroud 28, a track attachment system 344 of the turbine shroud 328 of the engine 10 illustratively includes a retainer 350 that is formed as a step integral with a carrier 334. The retainer 350 is configured to contact an insert 380 of a retainer attachment post 356 of the blade track 342 to block movement of the blade track 342 out of the cavity 348 when the positioner 346 is in the engaged position. The retainer attachment post 356 includes an end face 374 illustratively that extends both radially and axially at an angle. The end face 374 is configured for engagement with a face engagement surface 376 formed by the carrier 334 to have an angle that is complimentarily to the angle of the end face 374 as suggested in FIG. 6.

Figure 9:
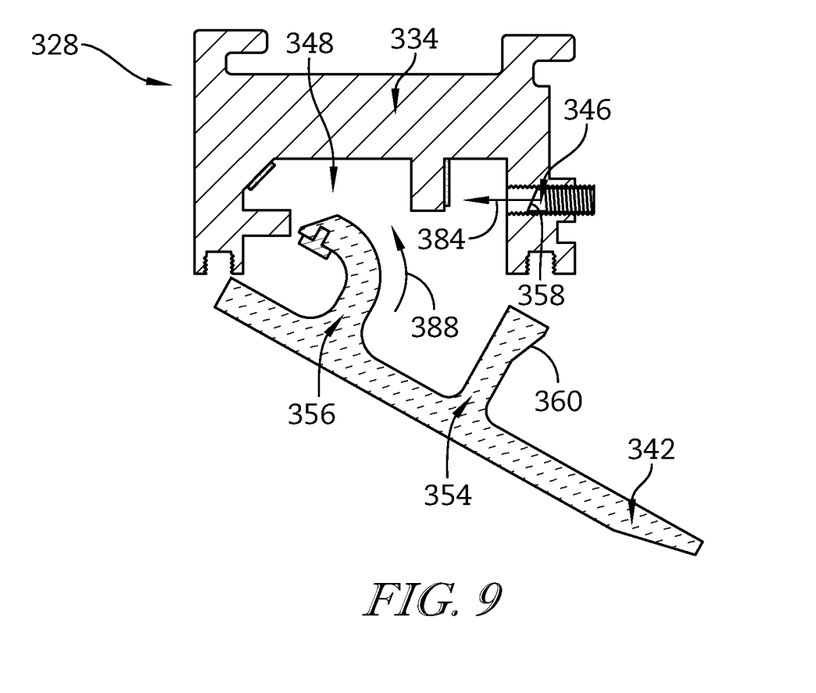
FIG. 9 is a cross-sectional view of an illustrative assembly process of the turbine shroud of FIG. 6 that is also generally applicable to the turbine shroud of FIG. 7 showing radial movement of the blade track segment and axial movement of the positioner.

Unlike the method of assembly of the turbine shroud 28, while the positioner 346 of the turbine shroud 328 is in the disengaged position, the blade track 342 is moved radially outward such that the first and retainer attachment posts 354, 356 are received within the inwardly-opening cavity 348 of the carrier 334 as suggested in FIG. 9. The arrow 388 illustratively indicates the radially outward movement of the blade track 342 which includes an element of rotation in the forward direction. Once the first and retainer attachment posts 354, 356 are received, the positioner 346 is illustratively moved to its engaged position as indicated by arrow 384 such that the position-setting surface 360 engages the track-positioning surface 358 to couple the blade track 342 to the carrier 334.

Figure 7:
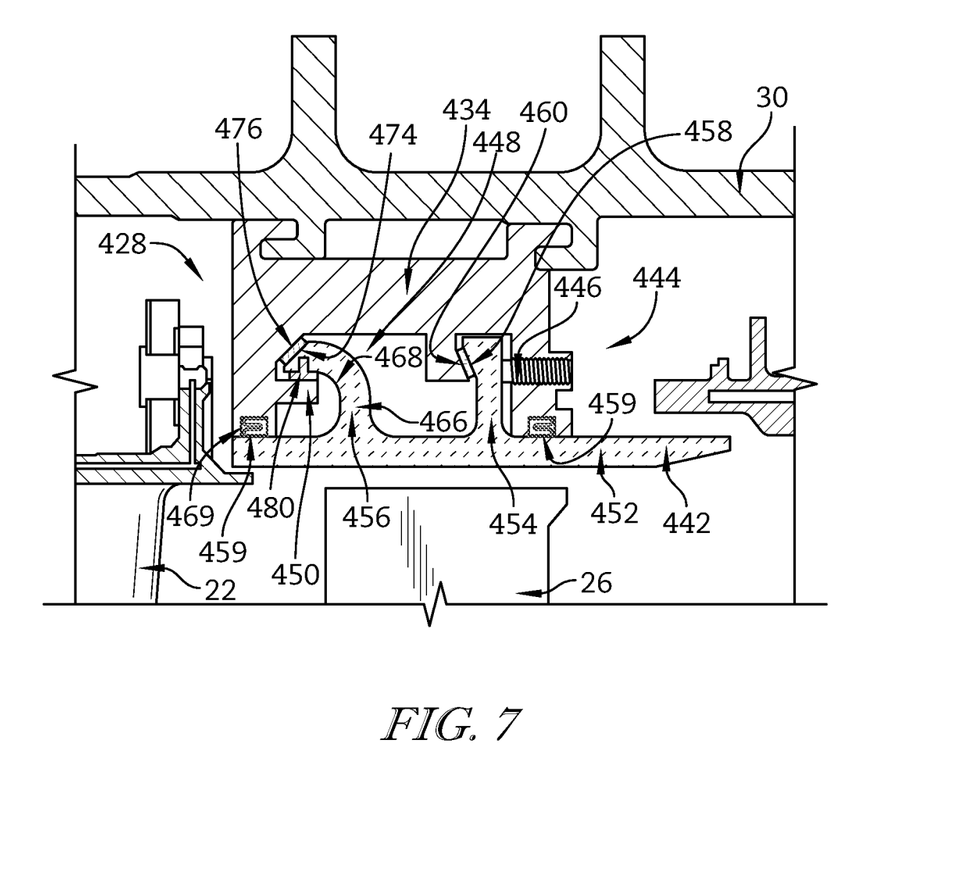
FIG. 7 is a detailed cross-sectional view of fourth track attachment system adapted for use in the turbine shroud of FIGS. 1-3 showing that the retainer of the track attachment system is a step formed integrally with the carrier and arranged to contact the retainer post of the blade track segment to block radially inward movement of the retainer post out of the inwardly-opening cavity of the carrier segment when the positioner is in the engaged position.

Referring now to FIG. 7, a fourth illustrative turbine shroud 428 is shown. The turbine shroud 428 is configured for use in engine 10 and is substantially similar to the turbine shroud 28 shown in FIGS. 1-4 and described herein. Accordingly, similar reference numbers in the 400 series indicate features that are common between the turbine shroud 28 and the turbine shroud 428. The description of the turbine shroud 28 and its method of assembly are hereby incorporated by reference to apply to the turbine shroud 228, except in instances when it conflicts with the specific description and drawings of the turbine shroud 428.

Unlike the turbine shroud 28, a track attachment system 444 of the turbine shroud 428 of the engine 10 illustratively includes a retainer 450 that is formed as a step integral with a carrier 434. The retainer 450 is configured to contact an insert 480 of a retainer attachment post 456 of the blade track 442 to block movement of the blade track 442 out of the cavity 448 when the positioner 446 is in the engaged position. The retainer attachment post 456 includes an end face 474 illustratively that extends both radially and axially at an angle. The end face 474 is configured for engagement with a face engagement surface 376 formed by the carrier 434 to have an angle that is complimentarily to the angle of the end face 474 as suggested in FIG. 7.

Also unlike the turbine shroud 28, the track attachment system 444 adapted for use in a turbine shroud 428 of the engine 10 includes a track-positioning surface 458 illustratively formed on a forward side of the positioner attachment post 454. The position-setting surface 460 is illustratively arranged on an opposite side of the positioner attachment post 454 from the positioner 446. In illustrative embodiments, when the positioner 446 is in the engaged position contacting an aft side of the positioner attachment post 454, the positioner attachment post 454 is urged in a direction away from the positioner 446 such that the track-positioning surface 458 engages the position-setting surface 460 to couple the blade track 442 to the carrier 434 with ramped attachment as suggested in FIG. 7.

Unlike the method of assembly of the turbine shroud 28, while the positioner 446 of the turbine shroud 428 is in the disengaged position, the blade track 442 is moved radially outward such that the first and retainer attachment posts 454, 456 are received within the inwardly-opening cavity 448 of the carrier 434 similar to that suggested in FIG. 9. The arrow 388 illustratively indicates the radially outward movement of the blade track 442 which includes an element of rotation in the forward direction. Once the first and retainer attachment posts 454, 456 are received, the positioner 446 is illustratively moved to its engaged position as indicated by arrow 384 such that the position-setting surface 460 engages the track-positioning surface 458 to couple the blade track 442 to the carrier 434.

The features of the present disclosure can simplify sealing and reduce face machining of plies in CMC components.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A segmented turbine shroud that extends around a central axis, the segmented turbine shroud comprising
a carrier segment that extends at least partway around the central axis and that forms a radially inwardly-opening cavity,
a blade track segment comprising ceramic-containing materials, the blade track segment formed to include a runner that extends partway around the central axis and a positioner feature arranged in the radially inwardly-opening cavity of the carrier segment, the positioner feature formed to include a track-positioning surface that extends both radially and axially, and
a track attachment system adapted to couple the blade track segment to the carrier segment, and the track attachment system including a positioner coupled to the carrier segment to move axially from a disengaged position out of contact with the positioner feature to an engaged position contacting the positioner feature to engage the track-positioning surface of the positioner feature with a position-setting surface that extends both radially and axially at an angle corresponding to that of the track-positioning surface.

2. The segmented turbine shroud of claim 1, wherein the position-setting surface is formed by the positioner.

3. The segmented turbine shroud of claim 2, wherein the positioner is formed to include positioner threads that engage corresponding threads formed in the carrier segment.

4. The segmented turbine shroud of claim 1, wherein the position-setting surface is formed by the carrier segment.

5. The segmented turbine shroud of claim 1, wherein the blade track segment includes a retainer attachment feature arranged in the radially inwardly-opening cavity of the carrier segment.

6. The segmented turbine shroud of claim 5, wherein the track attachment system includes a retainer coupled to the carrier segment to move axially from a disengaged position arranged to allow radially outward movement of the retainer attachment feature into the radially inwardly-opening cavity of the carrier segment to an engaged position arranged to block radially inward movement of the retainer attachment feature out of the radially inwardly-opening cavity of the carrier segment.

7. The segmented turbine shroud of claim 6, wherein the retainer attachment feature is provided by a retainer attachment post that has an L-shaped cross sectional profile, the L-shaped cross sectional profile includes a generally radially extending portion and a generally axially extending portion, and the retainer of the track attachment system is arranged radially inward of the axially extending portion when the retainer is in the engaged position.

8. The segmented turbine shroud of claim 5, wherein the track attachment system includes a step formed integrally with the carrier segment and arranged to contact a radially inner surface of the retainer attachment post to block radially inward movement of the retainer attachment post out of the radially inwardly-opening cavity of the carrier segment when the positioner is in the engaged position.

9. The segmented turbine shroud of claim 8, wherein the retainer attachment feature is provided by a retainer attachment post with an L-shaped cross sectional profile, the L-shaped cross sectional profile includes a generally radially extending portion and a generally axially extending portion, and the step of the track attachment system is arranged radially inward of the axially extending portion when the retainer attachment post is within the inwardly-opening cavity of the carrier segment.

10. The segmented turbine shroud of claim 1, wherein the carrier comprises a forward side wall, an aft side wall, a first circumferential end cap, and a second circumferential end cap that cooperate to define the radially inwardly-opening cavity of the carrier segment, the first circumferential end cap is formed to include a circumferentially-opening strip-seal slot sized to receive a strip seal, and the second circumferential end cap is formed to include a circumferentially-opening strip-seal slot sized to receive a strip seal.

11. A segmented turbine shroud that extends around a central axis, the segmented turbine shroud comprising
a carrier segment that extends partway around the central axis and that forms a radially inwardly-opening cavity,
a blade track segment comprising ceramic-containing materials, the blade track segment formed to include a runner that extends partway around the central axis and a retainer feature that extends radially outwardly into the radially inwardly-opening cavity of the carrier segment, and
a track attachment system adapted to couple the blade track segment to the carrier segment, the track attachment system including a retainer coupled to the carrier segment to move axially from a disengaged position arranged to allow radially outward movement of the retainer feature of the blade track segment into the radially inwardly-opening cavity of the carrier segment to an engaged position arranged to block radially inward movement of the retainer feature of the blade track segment out of the radially inwardly-opening cavity of the carrier segment.

12. The segmented turbine shroud of claim 11, wherein the retainer feature has an L-shaped cross sectional profile, the L-shaped cross sectional profile includes a generally radially extending portion and a generally axially extending portion, and the retainer of the track attachment system is arranged radially inward of the axially extending portion when the retainer is in the engaged position.

13. The segmented turbine shroud of claim 12, wherein the blade track segment includes a metallic insert that extends radially inward from the axially extending portion of the L-shaped cross sectional profile of the retainer feature and that is directly engaged by the retainer of the track attachment system when the retainer is in the engaged position.

14. The segmented turbine shroud of claim 11, wherein the blade track segment includes a positioner feature arranged in the radially inwardly-opening cavity of the carrier segment, the positioner feature formed to include a track-positioning surface that extends both radially and axially, and the track attachment system including a positioner coupled to the carrier segment to move axially from a disengaged position out of contact with the positioner feature to an engaged position contacting the positioner feature to engage the track-positioning surface of the positioner feature with a position-setting surface that extends both radially and axially.

15. The segmented turbine shroud of claim 14, wherein the position-setting surface is formed by the positioner.

16. The segmented turbine shroud of claim 14, wherein the position-setting surface is formed by the carrier segment.

17. The segmented turbine shroud of claim 14, wherein the retainer feature has an L-shaped cross sectional profile, the L-shaped cross sectional profile includes a generally radially extending portion and a generally axially extending portion, the axially extending portion of the L-shaped cross sectional profile has an end face surface that extends both radially and axially, and the end face surface engages an face engagement surface formed by the carrier segment that extends both axially and radially along an angle corresponding to that of the end face surface when the positioner is in the engaged position.

18. A segmented turbine shroud that extends around a central axis, the segmented turbine shroud comprising
a carrier segment comprising metallic materials that extends at least partway around the central axis,
a blade track segment comprising ceramic-containing materials, the blade track segment formed to include a runner that extends partway around the central axis and a track-positioning surface coupled arranged radially outward of the runner that extends both radially and axially, and
a track attachment system adapted to couple the blade track segment to the carrier segment, and the track attachment system including a positioner coupled to the carrier segment to move from a disengaged position out of contact with the track-positioning surface to a number of different engaged positions that each engage the track-positioning surface to establish a desired position of the runner included in the blade track segment.

19. The segmented turbine shroud of claim 18, wherein the positioner is coupled to the carrier segment to move axially from the disengaged position to the engaged positions.

20. The segmented turbine shroud of claim 18, wherein the track-positioning surface is spaced radially apart from the runner of the blade track segment.

* * * * *